United States Patent [19]

Nakao et al.

[11] Patent Number: 5,796,453
[45] Date of Patent: Aug. 18, 1998

[54] LIQUID CRYSTAL DISPLAY DEVICE, METHOD FOR PRODUCING THE SAME, AND PROJECTION-TYPE DISPLAY APPARATUS INCLUDING THE LIQUID CRYSTAL DISPLAY DEVICE

[75] Inventors: Kenji Nakao, Osaka; Masao Yamamoto, Kishiwada; Tsuyoshi Uemura, Kadoma, all of Japan

[73] Assignee: Matsushita Electric Industrial Co., Ltd., Osaka, Japan

[21] Appl. No.: 690,569

[22] Filed: Jul. 31, 1996

[30] Foreign Application Priority Data

Jul. 31, 1995 [JP] Japan .................... 7-194510
Nov. 30, 1995 [JP] Japan .................... 7-312013

[51] Int. Cl.$^6$ .................................. G02F 1/1333
[52] U.S. Cl. .................. 349/86; 349/88; 349/92
[58] Field of Search .................. 349/86, 92, 88

[56] References Cited

U.S. PATENT DOCUMENTS

| | | | |
|---|---|---|---|
| 5,331,446 | 7/1994 | Hirai et al. | 349/86 |
| 5,604,612 | 2/1997 | Coates et al. | 349/86 |
| 5,621,552 | 4/1997 | Coates et al. | 349/86 |

FOREIGN PATENT DOCUMENTS

| | | |
|---|---|---|
| 3-58021 | 3/1991 | Japan . |
| 3-58022 | 3/1991 | Japan . |
| 3-98022 | 4/1991 | Japan . |
| 4-225319 | 8/1992 | Japan . |
| 5-61015 | 3/1993 | Japan . |

OTHER PUBLICATIONS

J. William Doane, "Polymer Dispersed Liquid Crystal Displays", *Liquid Crystals, Applications and Uses*, vol. 1, Chapter 14, pp. 361–395, 1990.

*Primary Examiner*—William L. Sikes
*Assistant Examiner*—Tiep H. Nguyen
*Attorney, Agent, or Firm*—Ratner & Prestia

[57] ABSTRACT

A liquid crystal display device includes a pair of substrates; a liquid crystal layer interposed between the pair of substrates; and an electrode for applying a voltage to the liquid crystal layer. The liquid crystal layer includes a polymer dispersed liquid crystal material having a polymer phase and a liquid crystal phase, and fulfills the conditions represented by:

$$2.585 \cdot d^{(-1/3)} - 0.3 < R < 2.585 \cdot d^{(-1/3)} + 0.3$$

where d represents the thickness of the liquid crystal layer in the unit of micrometers and R represents the characteristic length of the liquid crystal phase in the unit of micrometers.

14 Claims, 7 Drawing Sheets

LIQUID CRYSTAL DISPLAY DEVICE, METHOD FOR PRODUCING THE SAME, AND PROJECTION-TYPE DISPLAY APPARATUS INCLUDING THE LIQUID CRYSTAL DISPLAY DEVICE

BACKGROUND OF THE INVENTION

1. Field of the Invention

The present invention relates to a liquid crystal display device, a method for producing the same, and a projection-type display apparatus including the liquid crystal display device.

2. Description of the Related Art

Recently, liquid crystal display devices for displaying images using polymer dispersed liquid crystal (PDLC) have been developed. PDLC is described in, for example, LIQUID CRYSTALS, APPLICATIONS AND USES, Vol. 1, Chapter 14, edited by Brendra Bahadur, World Scientific Publishing, 1990. A liquid crystal display device for displaying images using PLDC will be referred to as a "PDLCD" device.

A PDLC material has a structure including many liquid crystal droplets dispersed in a polymer matrix. When no voltage is applied to the PDLC material, liquid crystal molecules in the liquid crystal droplets are in a random orientation state. In this state, light incident on the PDLC material is scattered. When a voltage is applied to the PDLC material, the liquid crystal molecules in the liquid crystal droplets are aligned in the direction of the electric field. In the case where the ordinary light refractive index $n_o$ of the liquid crystal molecules is substantially equal to the refractive index $n_p$ of the polymer matrix, the light incident on the PDLC material is transmitted without scattering. Thus, the light-scattering state or light-transmitting state of the PDLC material can be selected by controlling the voltage applied. PDLCD devices display images using such an optical phenomenon of the PDLC material.

A PDLCD device and a projection-type display apparatus including a PDLCD device are disclosed in, for example, Japanese Laid-Open Patent Publication No. 3-58021. The PDLCD device disclosed in this publication displays images having a high contrast ratio using an active element and a driving circuit usable for a conventional TN-mode liquid crystal display device. Such a PDLCD device is designed so that the average diameter R (μm) of the liquid crystal droplets, the cell thickness d (μm), the refractive index anisotropy (birefringence) Δn of the PDLC material, and the maximum possible voltage V (Vmax) which can be applied to the PDLC material fulfill all the conditions represented by the following expressions. The average diameter R of the liquid crystal droplets and the cell thickness d influence the scattering characteristic and also the threshold characteristic (indicated by the threshold voltage) of the PDLC material.

$$0.3 < R \cdot \Delta n < 0.7$$

$$4R < d < 8R$$

$$0.5 \cdot R \cdot Vmax < d < R \cdot Vmax$$

Projection-type color display apparatuses for displaying color images have also been proposed. Such a projection-type color display apparatus includes three PDLC panels for receiving red (R), green (G) and blue (B) components of light. The three components of the light are combined to obtain a color image. However, the scattering characteristic of a PDLC material depends on the wavelength of light. The scattering intensity of a PDLC material with respect to red light having a relatively long wavelength is relatively low. Due to such dependence, the three PLDC panels used in combination in one display apparatus each need to have an optimum structure for the respective color of light. For example, the average diameter of the liquid crystal droplets and the cell thickness need to be adjusted for each panel.

In a color display apparatus disclosed in, for example, Japanese Laid-Open Patent Publication No. 3-58022, the average size of the liquid crystal droplets and the cell thickness are adjusted to be optimum for the respective color. In particular, this publication indicates the following conditions.

$$0.3 < R_o \cdot \Delta n < 0.7$$

$$4R_o < d_o < 8R_o$$

$$0.9 R_o/\lambda_o < R_x/\lambda_x < 1.1 R_o/\lambda_o$$

$$0.9 d_o/\lambda_o < d_x/\lambda_x < 1.1 d_o/\lambda_o$$

where Δn represents the birefringence of the PDLC material, $R_x$ (μm) represents the average diameter of the liquid crystal droplets in each PDLC panel for receiving each color of light, $d_x$ (μm) represents the cell thickness of each PDLC panel, $\lambda_x$ represents the dominant wavelength of each color of light, $R_o$ (μm) represents the average diameter of the liquid crystal droplets in the PDLC panel for receiving green light (dominant wavelength $\lambda_o = 540$ nm), and $d_o$ represents the cell thickness of the PDLC panel for receiving the green light.

In a color display apparatus disclosed in, for example, Japanese Laid-Open Patent Publication No. 3-98022, the average diameter of the liquid crystal droplets is equal among the three PDLC panels but the cell thicknesses thereof are optimized for the respective colors. In particular, this publication indicates the following conditions.

$$0.3 < R \cdot \Delta n < 0.7$$

$$4R < d < 8R$$

$$0.9 d_o/\lambda_o^{1/2} < 1.1 d_o/\lambda_o^{1/2}$$

where R (μm) represents the average diameter of the liquid crystal droplets, and the other symbols represent the same parameters as in the conditions mentioned above in connection with Japanese Laid-Open Patent Publication No. 3-58022.

Conventionally, as described above, the structure of the PDLC panel used in a PDLCD device needs to be optimized in consideration of the threshold voltage and the scattering characteristic of the PLDC material. In a color display apparatus using a PDLC material, the scattering characteristic of each PDLC panel needs to be optimized for the respective color of light. These requirements decrease the productivity of the display devices and apparatuses, and increase the production cost.

SUMMARY OF THE INVENTION

According to one aspect of the invention, a liquid crystal display device includes a pair of substrates; a liquid crystal layer interposed between the pair of substrates; and an electrode for applying a voltage to the liquid crystal layer. The liquid crystal layer includes a polymer dispersed liquid crystal material having a polymer phase and a liquid crystal phase, and fulfills the conditions represented by:

$$2.585 \cdot d^{(-1/3)} - 0.3 < R < 2.585 \cdot d^{(-1/3)} + 0.3$$

where d represents the thickness of the liquid crystal layer in the unit of micrometers and R represents the characteristic length of the liquid crystal phase in the unit of micrometers.

According to another aspect of the invention, a method for producing a liquid crystal display device including the above-described elements includes the step of performing polymerization-induced phase separation of a mixture including a liquid crystal material, a photopolymerizable monomer, and a photopolymerizable oligomer to form the polymer dispersed liquid crystal material. The polymer dispersed liquid crystal material fulfills the condition represented by:

$$0.8 \cdot 550 \cdot d^{(-1/3)} < M/O < 1.2 \cdot 550 \cdot d^{(-1/3)}$$

where d represents the distance between the pair of substrates in the unit of micrometers, M represents the weight ratio of the photopolymerizable monomer in the mixture, and O represents the weight ratio of the photopolymerizable oligomer in the mixture.

According to still another aspect of the invention, a liquid crystal layer included in a liquid crystal display device having the above-described elements fulfills the conditions represented by:

$$R \cdot \Delta n > 0.3 \text{ and } 8R < d$$

wherein d represents the thickness of the liquid crystal layer in the unit of micrometers, R represents the characteristic length of the liquid crystal phase in the unit of micrometers, and $\Delta n$ represents the birefringence of a liquid crystal material forming the liquid crystal phase.

According to yet another aspect of the invention, a liquid crystal layer included in a liquid crystal display device having the above-described elements has a scattering gain which changes by 20% or less when the thickness thereof changes by 10%.

According to yet another aspect of the invention, a liquid crystal layer included in a liquid crystal display device having the above-described elements has a scattering gain with respect to red light which is 1.2 times or less a scattering gain of the liquid crystal layer with respect to green light.

According to yet another aspect of the invention, a projection-type liquid crystal display apparatus includes a plurality of liquid crystal display devices having any one of the above-described structures.

Thus, the invention described herein makes possible the advantages of providing a PDLCD device having an improved threshold characteristic and an improved scattering characteristic which scattering characteristic is the same for various colors of light, a method for producing the same, and a projection-type liquid crystal display apparatus including three PDLCD devices having an identical structure with each other, which are respectively used for the RGB colors of light.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1A:
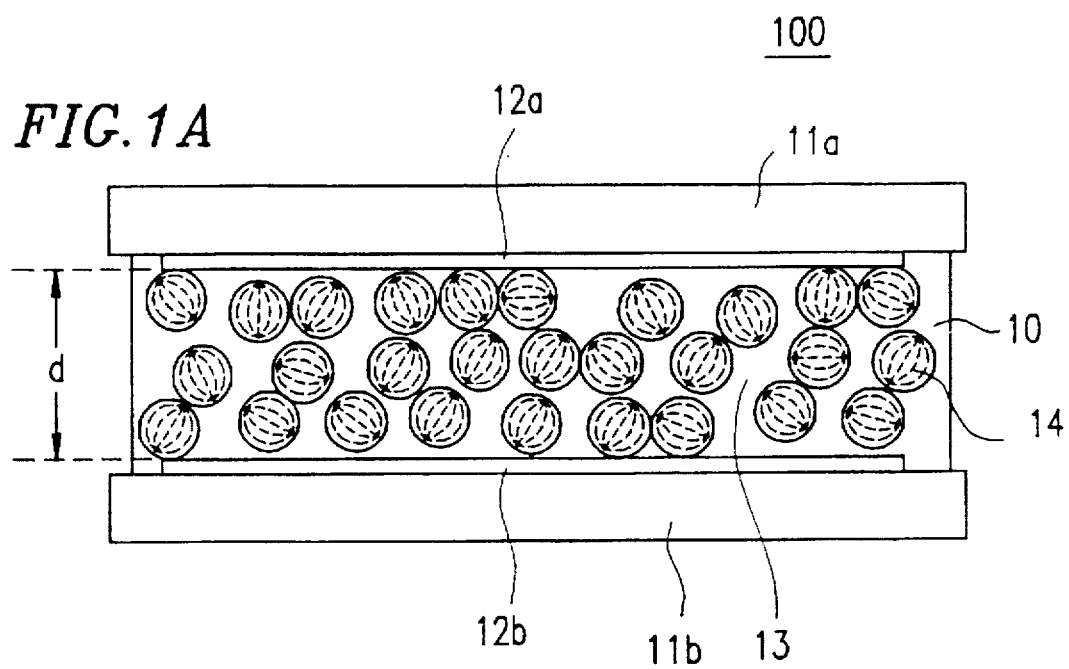
FIGS. 1A is a cross sectional view of a PDLCD device in a first example according to the present invention including one type of PDLC material.
Figure 1B:
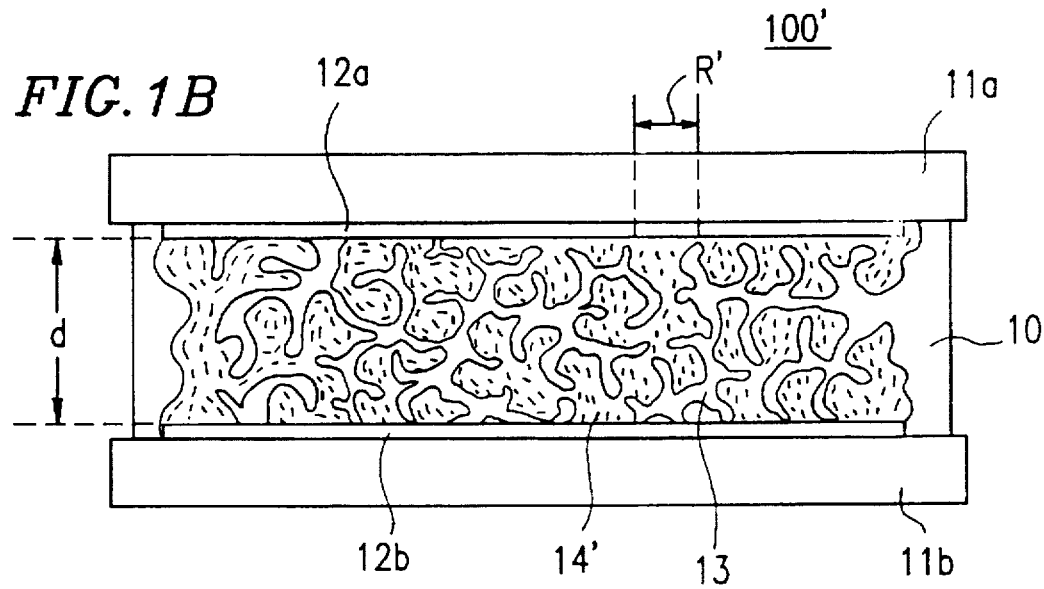
FIG. 1B is a cross sectional view of a PDLCD device in the first example including another type of PDLC material.

In this specification, the term "polymer dispersed liquid crystal (PDLC) material" is used to indicated either (1) a PDLC material including a liquid crystal phase dispersed in a polymer matrix as separate liquid crystal droplets as shown in FIG. 1A or (2) a PDLC material including a continuous liquid crystal phase as shown in FIG. 1B. The structure shown in FIG. 1B, in which both the liquid crystal phase and the polymer phase are continuous, is referred to as a "polymer network structure".

EXAMPLE 1

In a first example according to the present invention, a PDLCD device having a satisfactory display quality is provided by optimizing the relationship among the average diameter R of the liquid crystal droplets, the cell thickness d, and the characteristics such as threshold voltage and dependence of the scattering characteristic on the wavelength of incident light.

FIG. 1A is a cross sectional view of a PDLC device 100 in a first example according to the present invention.

As shown in FIG. 1A, the PDLC device 100 includes a pair of substrates 11a and 11b, and a liquid crystal layer 10 including a PDLC material. The PDLC material includes separate liquid crystal droplets 14 dispersed in a polymer matrix 13. Each PDLC droplet 14 is substantially spherical, and the size of the PDLC droplet 14 is defined by the diameter thereof. As a parameter influencing the performance of the PDLCD device 100, the average diameter R of all the liquid crystal droplets included in the liquid crystal layer 10 is used. The average diameter R is also referred to as the "characteristic length R".

The PDLC device 100 further includes transparent electrodes 12a and 12b on surfaces of the substrates 11a and 11b respectively, the surfaces sandwiching the liquid crystal layer 10. The transparent electrodes 12a and 12b are provided to apply a voltage to the liquid crystal layer 10. One of the substrates 11a or 11b can be an active matrix substrate which includes a plurality of transparent pixel electrodes arranged in a matrix and a plurality of thin film transistors (hereinafter, referred to as a "TFTs") for switching on or off the voltage applied to the pixel electrodes. The thickness d of the liquid crystal layer 10 (also referred to as the "cell thickness" or "cell gap") is adjusted by spacers (for example, resin beads) having a prescribed diameter. In FIG. 1A, the TFTs and the spacers are omitted for simplicity.

The liquid crystal droplets 14 as shown in FIG. 1A are perfect spheres and separate from one another, but the liquid crystal droplets can be deformed or partially connected to one another. The size of such liquid crystal droplets also can be defined by the average diameter R. In the case of a PDLC device 100' shown in FIG. 1B, which has a polymer network, the size of a channel 14' of a liquid crystal phase can be defined by the channel width thereof. As a parameter influencing the performance of the PDLCD device 100', the average channel width R' of the entire liquid crystal phase in the liquid crystal layer 10 is used. The average channel width R' is also referred to as the "characteristic length R".

The PDLC material can have a separate liquid crystal phase or a continuous liquid crystal phase as a result of selecting an appropriate material and controlling the phase separation conditions and the like. The PDLCD device 100 shown in FIG. 1A can be formed by, for example, a photopolymerization-induced phase separation method as described below.

First, a photopolymerizable compound containing a photopolymerizable monomer, a photopolymerizable oligomer and an initiator, and a liquid crystal material are mixed together to prepare a PDLC precursor. The resultant precursor is injected into a cell having a prescribed cell gap using, for example, a capillary phenomenon. Usable materials include: MJ958 (produced by Merck & Co., Inc.) as the liquid crystal material; 2-ethylhexylacrylate as the photopolymerizable monomer; Viscoat 828 (produced by Osaka Organic Chemical Ltd.) as the photopolymerizable oligomer; and Darocure 4265 (produced by Ciba-Geigy Corporation) as the initiator.

The resultant liquid crystal cell is irradiated by ultraviolet rays emitted by an ultra high-pressure mercury lamp (illuminance: 60 mW/cm$^2$ when the wavelength is 365 nm) at a temperature of about 20° C. for about 60 seconds. Ultraviolet rays having a wavelength of 350 nm or less and infrared rays are shielded by filters. By such ultraviolet radiation, the photopolymerizable compound in the precursor is polymerized to cause phase separation. As a result, a PDLC material including the liquid crystal droplets 14 dispersed in the polymer matrix 13 is obtained. Using the resultant PDLC material, the PDLCD 100 as shown in FIG. 1A can be produced by a known method. The liquid crystal material MJ958 has an ordinary light refractive index $n_o$ of 1.5295, an extraordinary light refractive index $n_e$ of 1.7806, and a birefringence $\Delta n$ of 0.2511. The refractive index $n_p$ of the polymer material forming the polymer matrix is 1.499.

The PDLC material obtained above is evaluated in the following manner.

The liquid crystal cell including the PDLC material is disassembled, and the liquid crystal material is washed away by isopropylalcohol.

As a result of an observation of the phase separation structure of the PDLC material by an optical microscope, it is found that the liquid crystal droplets included in the PDLC material are not perfect spheres but deformed and that some of the liquid crystal droplets are partially connected to one another. The average diameter R of the PDLC material is also obtained.

As an index for quantizing the scattering characteristic (scattering intensity) of the PDLCD device 100, scattering gain G is used. The scattering gain G is defined by the following expression:

$$G = \pi B/E$$

where E represents the illuminance of light on the light-receiving surface of the PDLCD device 100, and B represents the luminance of the light-receiving surface when no voltage is applied to the PDLCD device 100.

The scattering gain G is evaluated as follows. An outer surface of one of the substrates 10a or 10b is irradiated by vertically incident collimated light, and the illuminance E is measured using an illuminometer (for example, T-1M produced by Minolta Camera Co., Ltd.) located above the surface. The luminance B is measured by a luminancemeter (for example, BM-8 produced by TOPCON Corp.) located above a surface of the PDLCD device 100 opposite to the light-receiving surface. The light source, the PDLCD device 100 and the luminancemeter are located on a single straight line. The collection angle of the luminancemeter is 0.2° (±0.1°). If the PDLCD layer scatters incident light uniformly in all the directions, the scattering gain G is 0.5. When a sufficient level of voltage is applied to the PDLC layer 10, the collimated light incident on the PDLCD device 100 transmits therethrough without scattering and is incident on the luminancemeter. Therefore, a significantly high luminance is obtained. The contrast ratio of the image formed by a projection-type display apparatus including such a PDLC layer is in proportion to the inverse number of the scattering gain G. Unless described otherwise, the measurement of the scattering gain G is performed using green light (light transmitted through a luminosity factor filter). The scattering gain G is often used for evaluating the luminance of the display screen and is described in, for example, Ekisho Video Projector Gijutsu (Liquid Crystal Video Projector Technology, ed. T. Sasaki, Triceps Co., Ltd., Oct. 29, 1990, pp. 139–146.

The luminance B of the PDLCD device 100 is influenced by the aperture ratio thereof as well as by the scattering characteristic of the PDLC material. Herein, the scattering gain G is normalized with the aperture ratio of the PDLCD device 100. Hereinafter, unless any specific value of the aperture ratio is mentioned, the scattering gain G is indicated after normalization with an aperture ratio of 100%.

In the first example, the weight ratio of the liquid crystal material is fixed at 80%, and the weight ratio of the initiator is fixed at 0.1%. The weight ratio of photopolymerizable monomer with respect to the mixture is indicated by letter M. The weight ratio of photopolymerizable oligomer with respect to the mixture is indicated by letter O. The average diameter R of the liquid crystal droplets can be changed by changing the ratio M/O. When the ratio M/O is 0.7, the average diameter R is 1.2 μm. The average diameter R also can be changed by changing the weight ratio of the liquid crystal material contained in the precursor while the ratio M/O is maintained at the same value. The average diameter R also can be adjusted by changing the phase separation speed by, for example, (1) changing the photopolymerization speed by changing the illuminance of the ultraviolet rays or (2) changing the temperature of the precursor to be irradiated by the ultraviolet rays.

Using one of the above-described methods, PDLC materials including liquid crystal droplets having different average diameters are prepared. The relationships among the scattering characteristic (scattering gain G), the threshold characteristic, the average diameter R, and the cell thickness d are studied.

Figure 2:
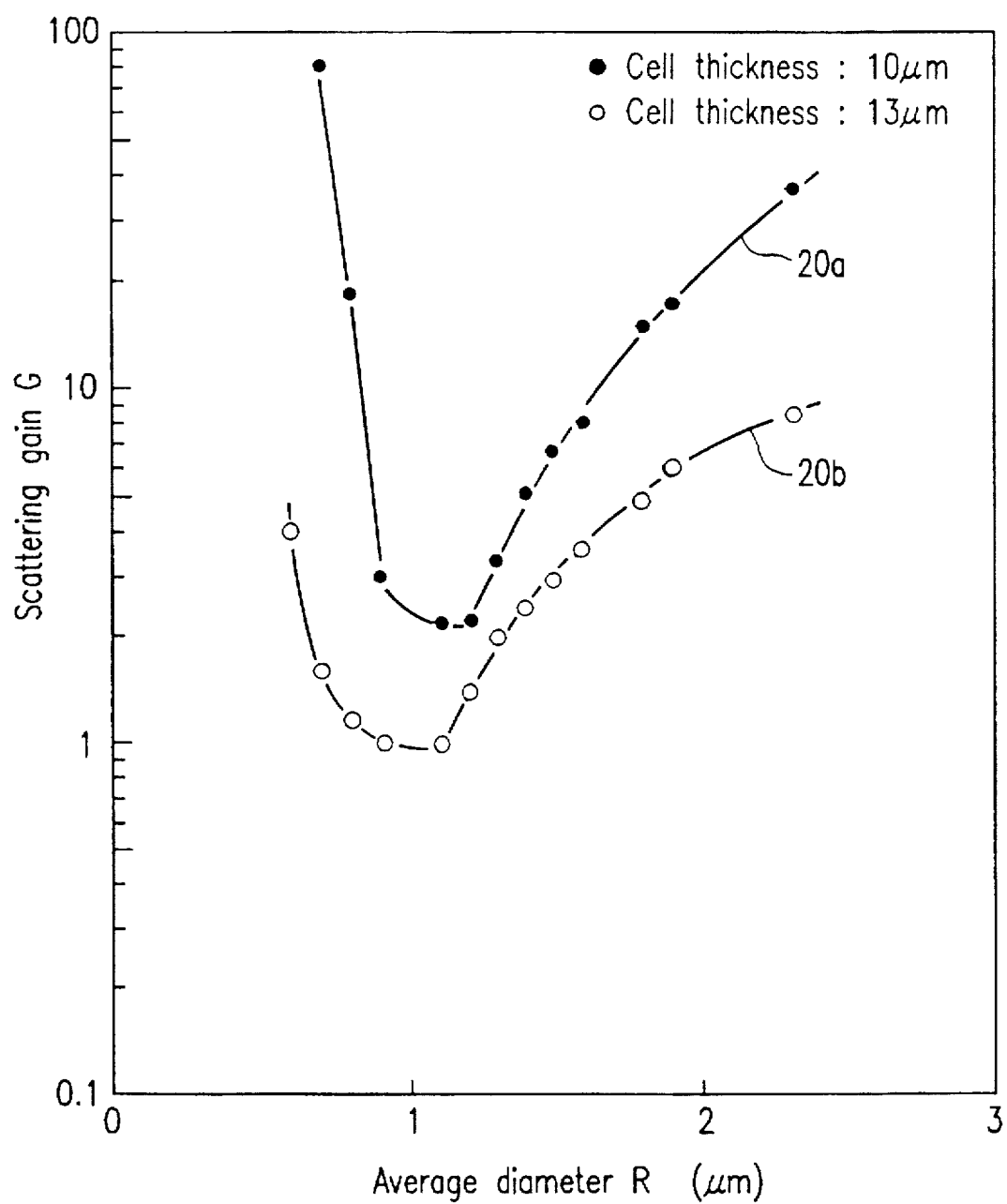
FIG. 2 is a graph illustrating the average diameter R vs. scattering gain G relationship of the PDLCD device in the first example.

FIG. 2 shows the average diameter R vs. scattering gain G relationship. Curve 20a represents the relationship obtained when the cell thickness d is about 10 µm, and curve 20b represents the relationship obtained when the cell thickness d is about 13 µm.

As appreciated from FIG. 2, the scattering gain G has a minimum value whether the cell thickness is about 10 µm or about 13 µm. When the average diameter R increases to an excessively large value, the scattering gain G becomes excessively large; i.e., the scattering characteristic becomes dissatisfactory for the following two reasons: (1) the number of liquid crystal droplets existing in the liquid crystal layer 10 in the cell thickness direction decreases, and thus the incident light is scattered a fewer number of times; and (2) the angle at which the light is scattered by each liquid crystal droplet (scattering angle) is decreased. When the average diameter R decreases to an excessively small value, the scattering gain G also becomes excessively large because the cross section of each liquid crystal droplet for scattering the light is reduced, thus causing a part of the light to pass straight through. The value of the average diameter R, at which the scattering gain G starts to increase as the average diameter R decreases, is referred to as the "critical diameter". When the cell thickness d is about 10 µm (curve 20a in FIG. 2), the critical diameter is about 1.0 µm; and when the cell thickness d is 13 µm (curve 20b in FIG. 2), the critical diameter is about 0.9 µm.

With respect to the same value of the average diameter R, the scattering gain G when the cell thickness d is about 13 µm is smaller than the scattering gain G when the cell thickness d is about 10 µm. The reason is that, when the cell thickness d increases, the number of times the incident light is scattered in the PDLC layer 10 increases (multiple scattering). As a result of the multiple scattering, the amount of light which passes straight through without scattering (transmitting light) decreases exponentially with respect to the cell thickness d. It is also considered to be due to the multiple scattering that the critical diameter when the cell thickness d is about 13 µm (about 0.9 µm) is smaller than the critical diameter when the cell thickness d is about 10 µm (about 1.0 µm). Even if the average diameter decreases to reduce the scattering intensity of one liquid crystal droplet and a part of the light is caused to run straight, there is a high possibility that the straight light is scattered by another liquid crystal droplet if the cell thickness d is relatively large. Accordingly, the scattering gain G decreases and thus the critical diameter is reduced. The inventors of the present invention have found that, as the cell thickness d increases, the critical diameter used as the index for optimization of the scattering characteristic decreases.

Figure 3:
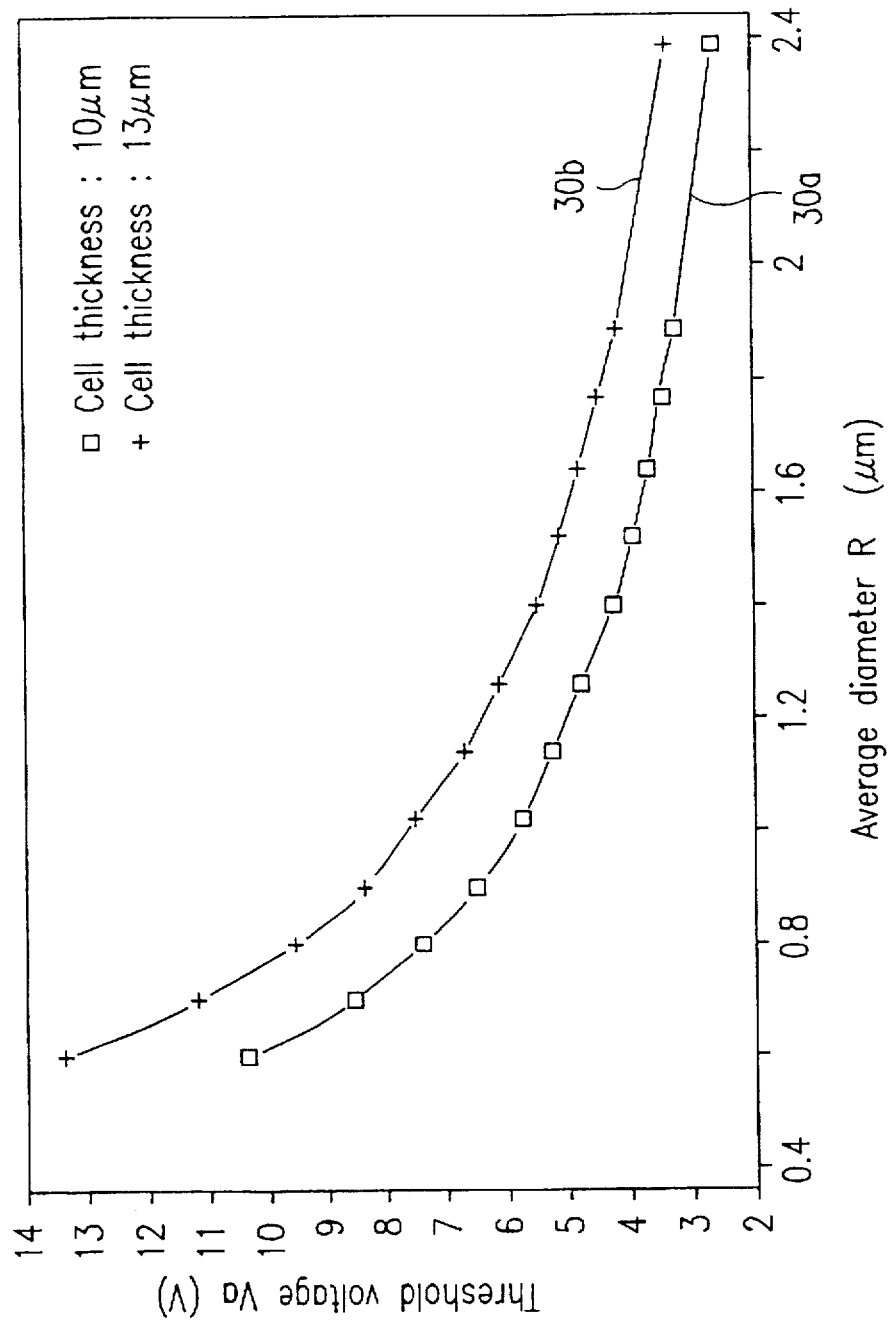
FIG. 3 is a graph illustrating the average diameter R vs. threshold voltage Va relationship of the PDLCD device in the first example.

FIG. 3 shows the average diameter R vs. threshold voltage Va relationship. The threshold voltage Va refers to the threshold voltage of the entire PDLC layer 10, whereas the threshold voltage Vd refers to the threshold voltage of each liquid crystal droplet. Curve 30a represents the relationship obtained when the cell thickness d is about 10 µm, and curve 30b represents the relationship obtained when the cell thickness d is about 13 µm.

As may be appreciated from FIG. 3, the threshold voltage is in inverse proportion to the average diameter R, presumably because the liquid crystal droplets have a threshold voltage Vd substantially equal to one another. The threshold voltage Vd of each liquid crystal droplet is a function of the threshold voltage Va of the entire PLDC layer 10, the cell thickness d, and the average diameter R, and is approximately represented by the expression:

$$Vd = Va \cdot R/d$$

In this example, the threshold voltage Vd is 0.6.

As the cell thickness d changes, the threshold voltage Va of the entire PDLC layer 10 changes substantially in proportion thereto for the same reason.

Figure 4:
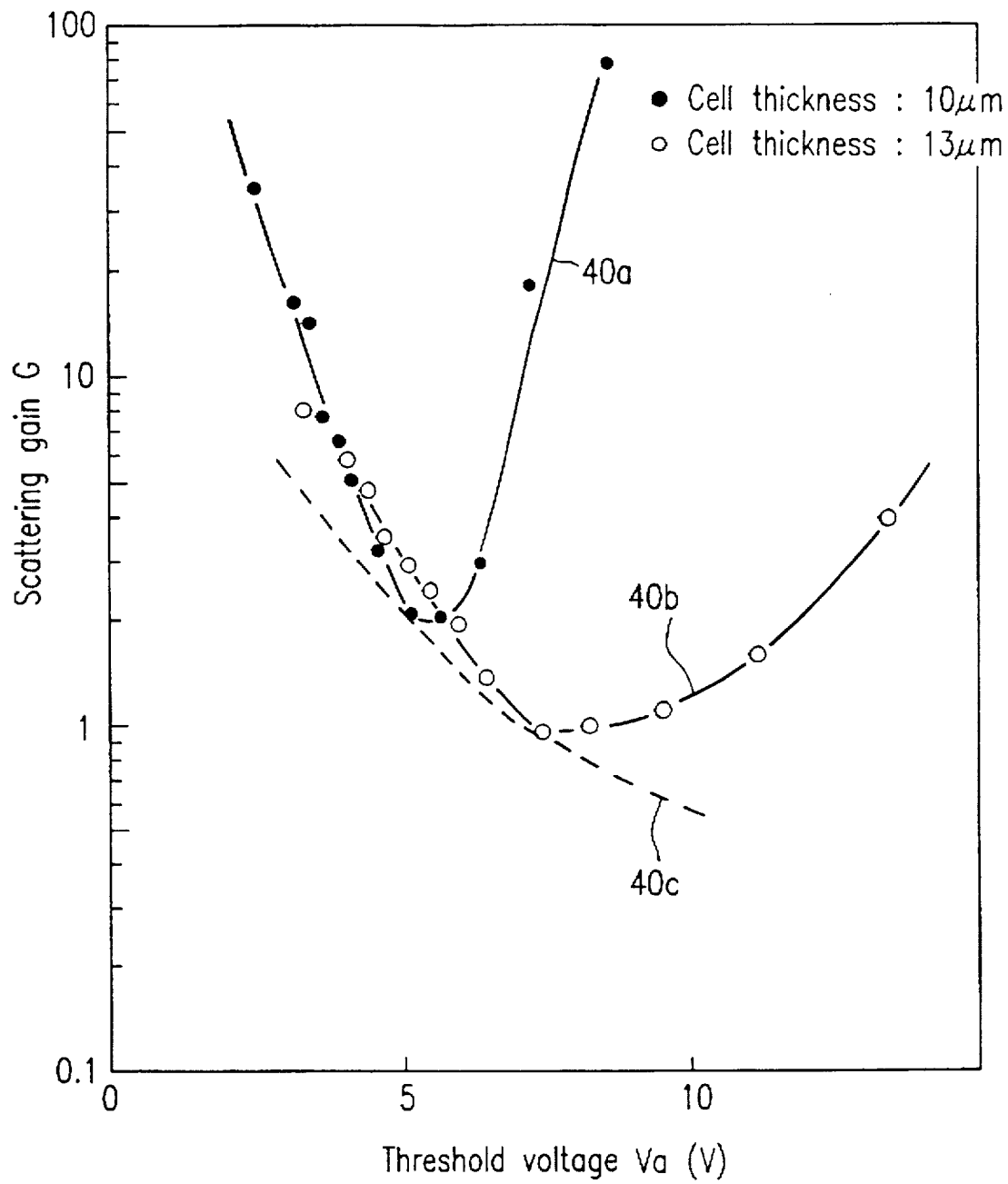
FIG. 4 is a graph illustrating the threshold voltage Va vs. scattering gain G relationship of the PDLCD device in the first example.

In order to optimize the average diameter R and the cell thickness d, it is preferable that the minimum possible scattering gain G and the minimum possible threshold voltage Va are obtained. The threshold voltage Va vs. scattering gain G relationship is examined regarding PDLC materials having various average diameters. The results are shown in FIG. 4. Curve 40a represents the relationship obtained when the cell thickness d is about 10 µm, and curve 40b represents the relationship obtained when the cell thickness d is about 13 µm. A point on each curve which is closest to the origin (threshold voltage Va: 0 V; scattering gain G: 0.1) indicates the optimum condition. The average diameter which provides the optimum condition for each cell thickness is referred as the "optimum average diameter".

The driving voltage for the PDLCD device 100 is limited by the driving device. Therefore, the threshold voltage Va of the PDLC layer 10 is set in accordance with the driving voltage. For example, when the PDLC device 100 is of an active matrix type, the threshold voltage Va of the PDLC layer 10a is limited by the active elements such as TFTs. The threshold voltage Va and the scattering gain G depend on the cell thickness d and the average diameter R, as described above. Furthermore, the average diameter R corresponding to the minimum possible scattering gain G depends on the cell thickness d. Accordingly, it is necessary to first determine the optimum average diameter for each cell thickness, and then to select the optimum cell thickness and the optimum average diameter.

As seen from FIG. 4, the optimum average diameter for a cell thickness of about 10 µm is about 1.2 µm, and the optimum average diameter for a cell thickness of about 13 µm is about 1.1 µm. Although not shown in FIG. 4, the optimum average diameters for cell thicknesses of about 9 µm and about 20 µm are about 1.25 µm and 0.95 µm, respectively. As the cell thickness d increases, the optimum average diameter R decreases for the same reason as described above in connection with the critical diameter.

As a result of connecting the optimum average diameters for the above-mentioned cell thicknesses, curve 40c (dashed line) is obtained. Selection of the PDLC material having the optimum condition refers to selection of a point on curve 40c corresponding to the threshold voltage Va determined by the driving voltage.

Table 1 shows the optimum average diameter for each cell thickness d and the ratio M/O required for preparing a PDLC material having such an optimum average diameter. As described above, letter M indicates weight ratio of the photopolymerizable monomer, and letter O indicates the weight ratio of the photopolymerizable oligomer.

TABLE 1

| Cell thickness d (µm) | Optimum average diameter R (µm) | M/O |
|---|---|---|
| 9 | 1.25 | 21.6 |
| 10 | 1.20 | 17.4 |
| 13 | 1.10 | 12.4 |
| 20 | 0.95 | 7.0 |

From Table 1, the cell thickness d and the optimum average diameter R have the following relationship:

$$R = 2.585 \cdot d^{-1.0}$$

Regarding the optimum average diameter, an error of within about ±0.3 μm causes no problem in practice, but an error of within about ±0.1 μm is preferable.

The relationship between the cell thickness d and the ratio M/O is approximately represented by the expression:

$$M/O = 550 \cdot d^{-2.0}$$

Regarding the ratio M/O, an error of within about ±20% has no problem in practice, but an error of within about ±10% is preferable.

Considering that the practical driving voltage for an active matrix PDLCD device including TFTs is in the range of about 6 to 12 V, the optimum average diameter R and the cell thickness d are preferably in the following ranges, respectively.

$$0.9 < R < 1.25$$

$$8 < d < 15$$

By optimizing the cell thickness d and the optimum average diameter R based on the above-described expressions, a PDLC material having a sufficiently low scattering gain (a sufficiently high scattering intensity) and a sufficiently low threshold voltage can be obtained. A PDLCD device including such a PDLC material can be driven by a sufficiently low voltage to display high quality images.

EXAMPLE 2

Figure 7:
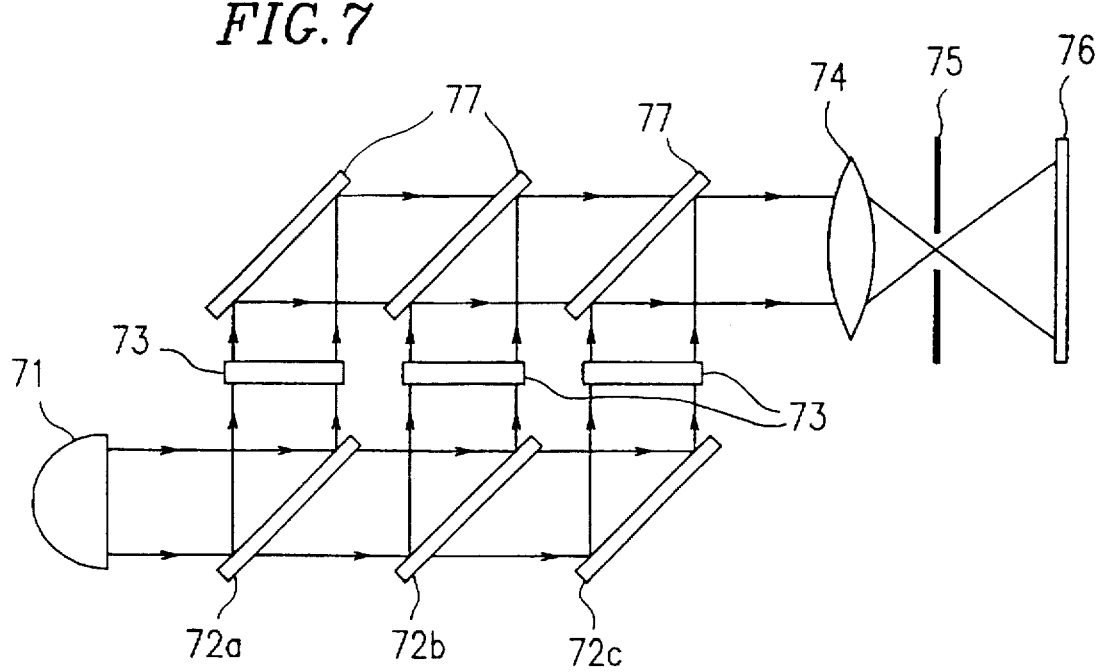
FIG. 7 is a schematic view of the projection-type display apparatus in the second example.

FIG. 7 is a schematic view of a projection-type color display apparatus 70 in a second example according to the present invention. The projection-type color display apparatus 70 includes three PDLCD devices 73, which have a structure commonly usable for the three RGB colors. The PDLCD devices 73 basically have the same structure as the PDLCD device 100 described in the first example and are respectively used for the RGB colors.

The projection-type color display apparatus 70 operates in the following manner.

White light emitted by a light source 71 is color-separated by three dichroic mirrors 72a, 72b and 72c into three components of the RGB colors and guided to the PDLCD devices 73 for the three RGB colors. The dichroic mirrors 72a, 72b and 72c respectively reflect light of wavelengths of 480 to 500 nm (blue), 530 to 570 nm (green), and 600 or more (red). The intensity of each component of light is then modulated by the respective PDLCD device 73, and is reflected by a corresponding mirror 77. The three components of light are then combined by an optical projection system including a projection lens 74 and a diaphragm 75, and then projected on a screen 76.

The dependence of the characteristics of the PDLC layer 10 of each PDLCD device 73 on the wavelength is examined as described below.

Figure 5:
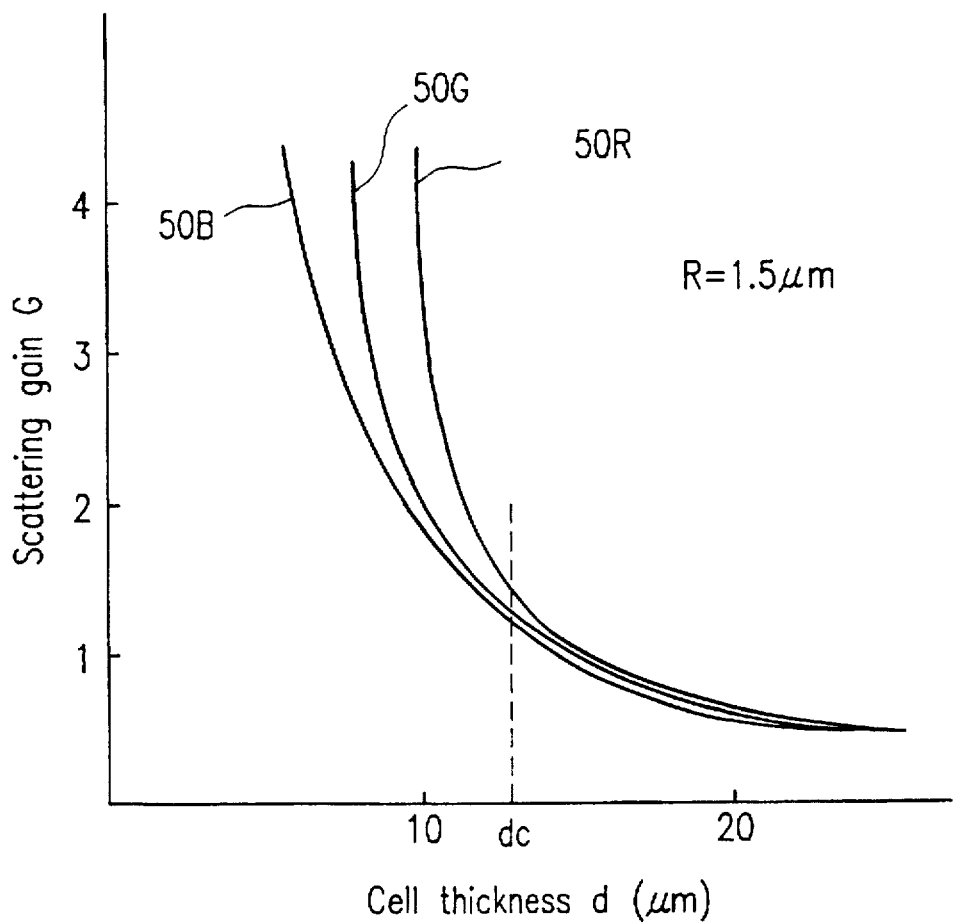
FIG. 5 is a graph illustrating the cell thickness d vs. scattering gain G relationship of any one of the PDLCD devices included in a projection-type display apparatus in a second example according to the present invention, the relationship being shown with respect to each of the RGB colors of light.

FIG. 5 shows the dependence of the scattering gain G on the cell thickness d regarding the RGB colors of light. Curve 50R represents the dependence regarding the red light; curve 50G represents the dependence regarding the green light; and curve 50B represents the dependence regarding the blue light. Each PDLCD 73 is formed of the same materials as the PDLCD 100 in the first example except that TL213 (produced by Merck & Co., Inc.; $n_o$=1.5273; $n_e$=1.7664; and Δn=0.2391) is used as the liquid crystal material.

As may be appreciated from FIG. 5, as the cell thickness d decreases, the scattering gain G increases; i.e., the scattering intensity decreases. Especially, in the case of the red light, the scattering gain G starts to increase rapidly at a greater cell thickness than in the case of the green or blue light.

A cell thickness, at which the scattering gain G with respect to each color starts increasing rapidly, is referred to as the "critical thickness dc". In particular, the minimum cell thickness at which the absolute value (|ΔG/Δdc|) of the gradient of curve 50R is one or less is defined as the "critical cell thickness dc". Under such conditions, as the cell thickness changes by 10%, the scattering gain G changes by 10% or less. There is no practical problem even if the critical thickness dc is defined so as to fulfill the condition that the scattering gain G changes by 20% or less as the cell thickness changes by 10%. In such a case, the selection of the materials and the production margin can be widened. The critical cell thickness can be defined in either way in accordance with the actual use, etc.

A PDLCD device having a cell thickness less than the critical cell thickness dc has an excessively low scattering intensity with respect to red light. A projection-type image display apparatus including such PDLCD devices has a problem that a black object is displayed as a reddish black image. In a projection-type image display apparatus including PDLCD devices having a cell thickness equal to or greater than the critical cell thickness, a black object is displayed as a satisfactory black image because the difference in the scattering gains G with respect to the RGB colors of light is relatively small. The color balance is also satisfactory.

A PDLCD device having a cell thickness equal to or greater than the critical cell thickness has another advantage that, even if the cell thickness is not uniform entirely, such non-uniformity tends not to influence the image quality. Moreover, even if the birefringence Δn of the liquid crystal material changes in accordance with the temperature of the PDLCD device, such a change tends not to influence the image quality when the cell thickness is equal to or greater than the critical cell thickness.

For these reasons, it is desirable that the cell thickness is equal to or greater than the critical cell thickness. In FIG. 5, the scattering gains G with respect to the RGB colors of light are 1.45, 1.2, and 1.15, respectively. The scattering gain G with respect to red light is about 1.2 times the scattering gain G with respect to green light. It has been found as a result of various studies that such a relationship regarding the scattering gain G is obtained when the cell thickness is equal to or greater than the critical cell thickness.

It has also been found that the critical cell thickness dc depends on the average diameter R. The reason is that, since the light-scattering cross section is a function of the average diameter of the liquid crystal droplets as described above, the scattering behavior varies in accordance with the average diameter. Table 2 shows the average diameter R vs. critical diameter dc relationship of the PDLCD device 73 in the second example.

TABLE 2

| Average diameter R (μm) | Critical diameter dc (μm) |
|---|---|
| 1.3 | 10.5 |
| 1.5 | 13.0 |
| 1.7 | 14.0 |

The average diameter R vs. critical diameter dc relationship shown in Table 2 is represented by the following expression based on experimental results.

$$dc = 8.0 \cdot R$$

Figure 6:
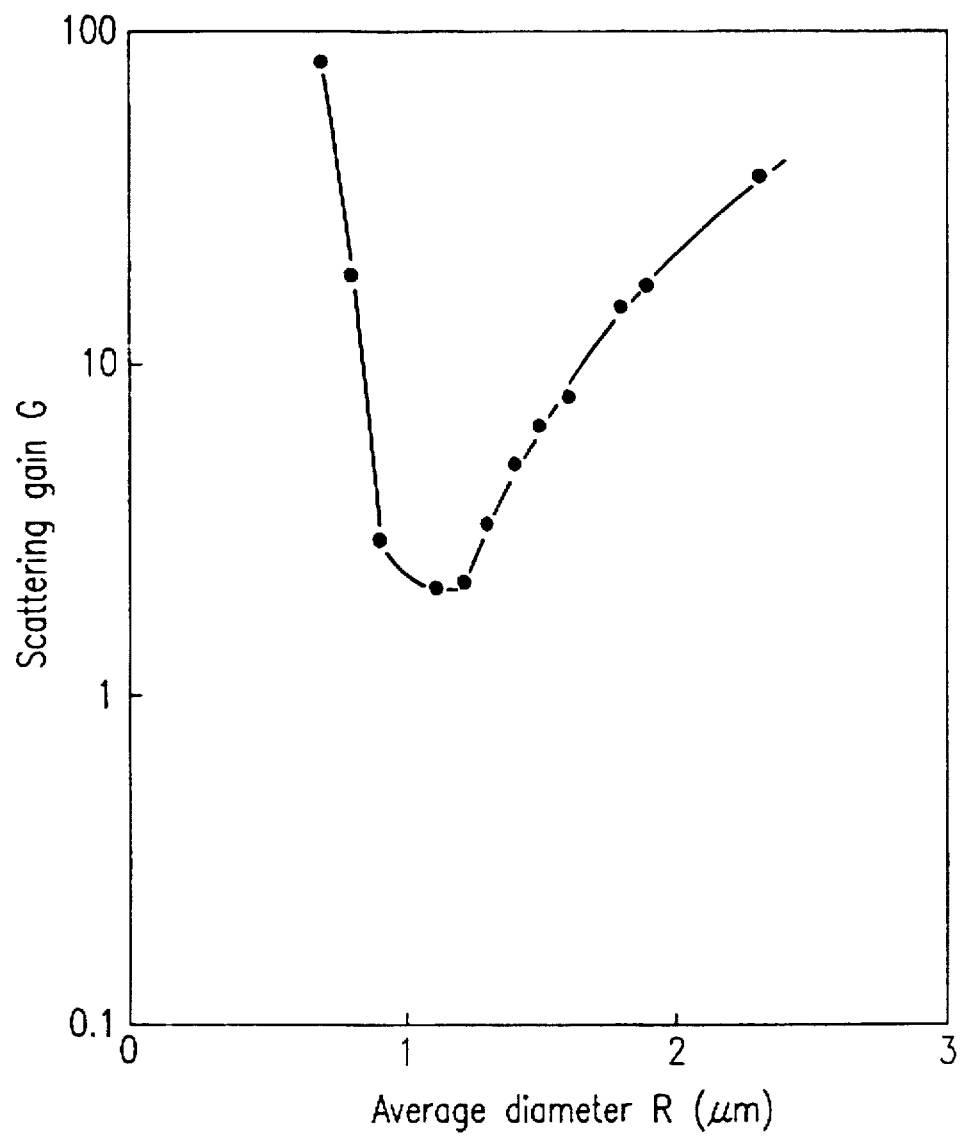
FIG. 6 is a graph illustrating the average diameter R vs. scattering gain G relationship of the projection-type display apparatus in the second example.

The average diameter R and the critical diameter dc do not have the above relationship when the diameter is less than 1.2 μm, presumably for the following reason. As shown in FIG. 6, the scattering gain G for red light increases rapidly at the average diameter of about 1.2 μm. Such a rapid increase occurs because a part of the incident light is caused to pass straight through when the light-scattering cross section of the liquid crystal droplets becomes smaller than the geometrical cross section of the liquid crystal droplets. Due to such a rapid increase in the scattering gain at the average diameter of about 1.2 μm, the average diameter R and the critical thickness do not have the relationship represented by the above expression. The lowest value of the average diameter which fulfills the condition represented by the above expression is related to the scattering characteristic (light-scattering cross sectional area) of the liquid crystal droplets and is given by the expression:

$$R \cdot \Delta n > 0.3$$

It is more preferable that the average diameter R fulfills the condition of:

$$R \cdot \Delta n > 0.35.$$

As a result of studying the response time (response speed) vs. average diameter relationship, it has been found that the response time almost does not depend on the average diameter at all and mainly depends on the applied electric field (applied voltage÷cell thickness). The response time is the sum of the rising time and the falling time. As described above, the maximum voltage which can be applied to the PDLC layer 10 is limited by the characteristics of the driving device, and thus the cell thickness is determined by the characteristics of the driving device. As the cell thickness decreases, the response speed increases. In this example, the maximum driving voltage is 10 V based on the characteristics of the TFTs used in the PDLCD device 73, and the maximum cell thickness is 18 μm. Under these conditions, the response time is 100 ms. Since the maximum driving voltage for TFTs generally used today in active matrix display apparatuses using a PDLC material is also about 10 V, the cell thickness of such an active matrix display apparatus is preferably 18 μm or less. The cell thickness is preferably less than 1.2 dc in order to raise the response speed.

The above-described conditions are summarized by the following two expressions.

$$R \cdot \Delta n > 0.3 \text{ and } 8R < d < 18$$

More preferably, $$R \cdot \Delta n > 0.35 \text{ and } 8R < d < 1.2 \, dc$$

Using a PDLC material fulfilling the above conditions, a projection-type color display apparatus having satisfactory characteristics with sufficient uniformity in color is obtained even with one type of PDLC panels.

As described above, according to the present invention, a PDLCD device having satisfactory display quality is provided by optimizing the relationship among the average diameter R of the liquid crystal droplets, the cell thickness d, and the characteristics such as threshold voltage and dependence of the scattering characteristic on the wavelength of incident light. Also according to the present invention, a projection-type display apparatus includes three such PDLCD devices. The combination of these three PDLCD devices having the same structure forms color images with satisfactory uniformity in color.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a pair of substrates;

a liquid crystal layer interposed between the pair of substrates; and an electrode for applying a voltage to the liquid crystal layer, wherein the liquid crystal layer includes a polymer dispersed liquid crystal material having a polymer phase and a liquid crystal phase, and fulfills the conditions represented by:

$$2.585 \cdot d^{(-1/2)} - 0.3 < R < 2.585 \cdot d^{(-1/2)} + 0.3$$

where d represents the thickness of the liquid crystal layer in the unit of micrometers and R represents the characteristic length of the liquid crystal phase in the unit of micrometers.

2. A liquid crystal display device according to claim 1, wherein the liquid crystal layer fulfills the conditions represented by:

$$2.585 \cdot d^{(-1/2)} - 0.1 < R < 2.585 \cdot d^{(-1/2)} + 0.1.$$

3. A liquid crystal display device according to claim 1, wherein the characteristic length R fulfills the condition of $0.9 < R < 1.25$.

4. A liquid crystal display device according to claim 1, wherein the thickness d of the liquid crystal layer fulfills the condition of $8 < d < 15$.

5. A liquid crystal display device according to claim 1, wherein the liquid crystal layer fulfills the conditions represented by:

$$R \cdot \Delta n > 0.3 \text{ and } 8R < d$$

wherein Δn represents the birefringence of the liquid crystal material forming the liquid crystal phase.

6. A liquid crystal display device according to claim 5, wherein the liquid crystal layer fulfills the conditions represented by:

$$R \cdot \Delta n > 0.35 \text{ and } d < 1.2 \, dc$$

wherein dc represents a minimum thickness of the liquid crystal layer which allows a scattering gain of the liquid crystal layer to change by 20% or less when the thickness of the liquid crystal layer changes by 10%.

7. A projection-type liquid crystal display apparatus comprising a plurality of liquid crystal display devices according to claim 6.

8. A projection-type liquid crystal display apparatus comprising of plurality of liquid crystal display devices according to claim 5.

9. A liquid crystal display device according to claim 1, wherein a scattering gain of the liquid crystal layer changes by 20% or less when the thickness thereof changes by 10%.

10. A liquid crystal display device according to claim 9, wherein the scattering gain of the liquid crystal layer changes by 10% or less when the thickness thereof changes by 10%.

11. A projection-type liquid crystal display apparatus comprising a plurality of liquid crystal display devices according to claim 10.

12. A projection-type liquid crystal display apparatus comprising a plurality of liquid crystal display devices according to claim 9.

13. A liquid crystal display device according to claim 1, wherein a scattering gain of the liquid crystal layer with respect to red light is 1.2 times or less a scattering gain of the liquid crystal layer with respect to green light.

14. A projection-type liquid crystal display apparatus comprising a plurality of liquid crystal display devices according to claim 13.

* * * * *